Nov. 10, 1942.         G. SAUER              2,301,460
                    LIQUID LEVEL GAUGE
                    Filed May 27, 1940
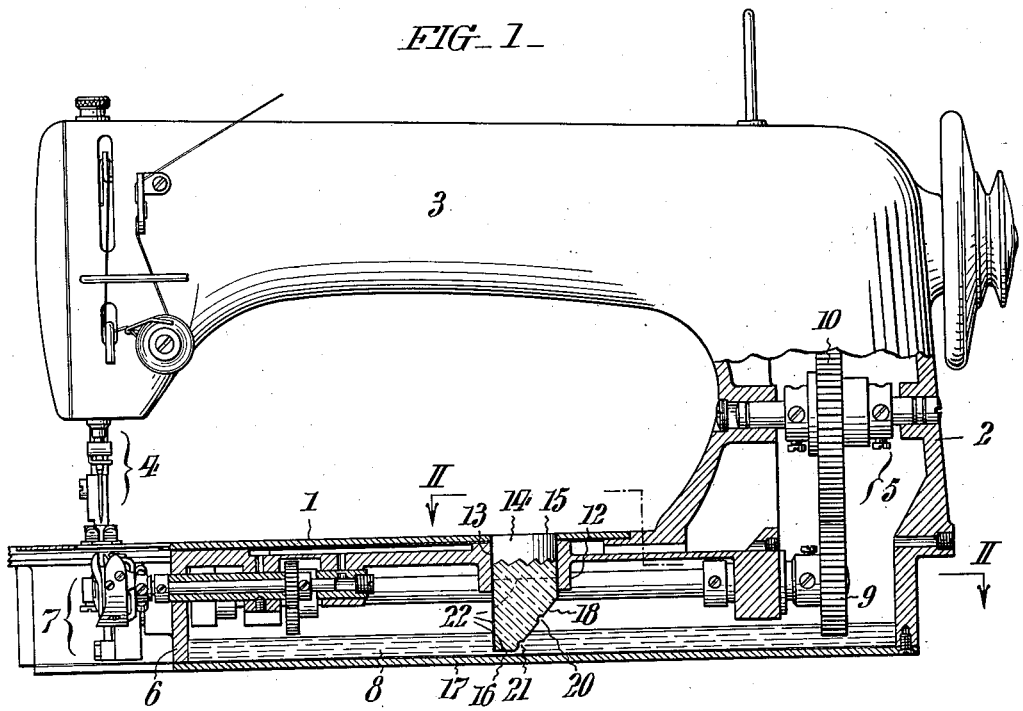
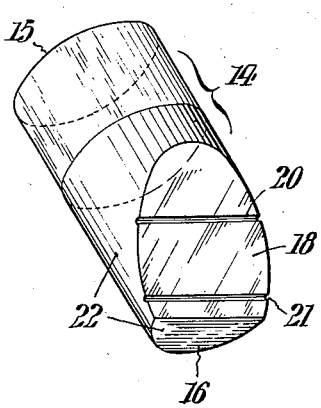
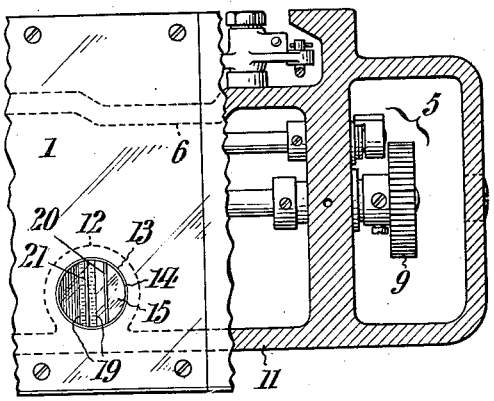
WITNESSES:                         INVENTOR:
                                George Sauer,
                          BY
                                ATTORNEYS.

Patented Nov. 10, 1942

2,301,460

UNITED STATES PATENT OFFICE 2,301,460

LIQUID LEVEL GAUGE

George Sauer, Berwyn, Ill., assignor to Union Special Machine Company, Chicago, Ill., a corporation of Illinois Application May 27, 1940, Serial No. 337,499

4 Claims. (Cl. 73—327)

This invention relates to a sight gauge adapted to give visible indication of the depth of oil in a dark receptacle.

In a rapidly running sewing machine, there is frequently a closed housing with an oil sump at the bottom thereof. When the machine is in operation oil is taken up by the mechanism and carried to the parts needing lubrication, whence it again falls into the sump. It is essential that the oil in the sump be not allowed to fall below a definite minimum level as otherwise it will not circulate, and it is desirable that oil does not rise above a maximum level satisfactory for efficient operation of the machine. The closed housing forms a perfectly dark receptacle. The oil itself becomes opaque and it is consequently difficult by any sight gauge inserted in the bed plate of the machine to get visible indication as a warning that the oil is approaching either its maximum or minimum level. Gauges at the side of a machine are liable to be broken and are otherwise objectionable.

My invention accordingly relates more specifically to a sight gauge which may be used in connection with sewing machines in which the mechanism runs in an oil tight housing and in which the gauge is inserted through the work plate of the sewing machine and reaches clear down to the minimum oil level, and is so constructed as to give a constant visible indication of this level.

To this end my depth gauge is constructed of transparent material and of convenient size and dimensions to be inserted in and supported by the work plate of the machine. It is of sufficient length to reach from at or about the surface of the work plate to the minimum oil level. It is conveniently cylindrical in form, and is provided with two facets. The upper facet is preferably level with the upper face of the work plate and therefore usually in horizontal position. Through this facet, light from above passes into the gauge. The lower facet constitutes a more or less extensive surface cut at an oblique angle and under normal conditions partially immersed in the oil. The angle of this facet should be such that so much of it as is not in contact with oil reflects upwardly the light which has reached it, while that part which is in contact with the oil in the sump absorbs light without reflecting it so that there is always a sharp line of demarcation representing the fluid level in the receptacle but greatly accentuated by the differing degrees of light reflection, dependent upon how much of the outside of the face is or is not in contact with the fluid. There are indicating marks in connection with this lower facet defining the minimum and usually also the maximum permissible fluid level. In order that the light entering through the upper facet may reach clear down to the lower facet the other surfaces of the indicating device are provided with a coating of light reflecting material which causes the light entering from above to be reflected and compelled to travel down to the bottom of the gauge.

In the accompanying drawing:

Fig. 1 is a broken part elevation and part vertical section of the upper portion of a sewing machine showing the application of my invention thereto.

Fig. 2 is a part plan and part sectional view, taken approximately on the staggered plane II—II of Fig. 1; and, Fig. 3 is a perspective view of the liquid level indicating device of this invention.

The work plate of a sewing machine is designated 1. It is associated with a standard 2 and arm 3 jointly housing stitch forming mechanism 4 and operating mechanism 5. Below the plate 1 is a receptacle 6 containing the feed mechanism 7 and the lower stitch forming mechanism and also serving as an oil sump 8 from which the gears 9 and 10 may conduct oil to various parts requiring lubrication.

The front wall 11 of the sump 8 is provided with a suitable projection 12 having a vertical bore 13 in which is fitted the sight gauge 14 which is thus located so as to be at all times in easy view of the operator.

The gauge 14 consists of suitable transparent material, as for example, glass or Lucite, and is formed with an upper, light-admitting facet 15 more or less flush with the surface of the work plate 1. The length of the gauge is such that the lower end 16 reaches down to the minimum permissible oil level, and therefore nearly to the bottom 17 of the sump 8. This lower portion is provided with a facet 18 having an angle of inclination so related to the angle of refraction of light rays into oil contacting said facet that there is created, by absorption of light in oil and by its reflection from the air contacting part of said facet, a darkened area 19 of a depth varying with the depth of the oil in the sump which sharply contrasts with the reflecting portion of the facet.

In order to define the maximum and minimum depth of oil in the pan for proper lubrication of the moving parts, there is associated with the lower facet upper and lower transverse marks 20 and 21, respectively, which may be colored red. The surrounding surface of the gauge as well as the bottom segmental portion 16 are rendered highly light reflective by a coating 22 of suitable light reflecting paint, as a result of which light rays passing down through the upper facet 15 are reflected by the lower facet 18 except for that part of it which is in contact with the oil, so that the sharp line of demarcation thereby created follows the ascent or descent of the oil, producing a darkened area, the upper edge of which parallels the lines 20 and 21.

When the sump 8 contains a proper amount of oil for efficient lubrication, the upper edge of the darkened area 19 lies somewhere between the lines 20, 21. Thus the user of the machine has a clear indication that the oil condition is safe. On the other hand, if the darkened area 19 sinks below the line 21 or rises above the line 20, the user of the machine is thereby notified that the supply of oil needs correction.

Obviously the size and proportions of the sight gauge 14, as well as the angle and extent of the indicating facet 18, may be changed to suit different requirements, the angle of light entry, or other usages of the invention.

Having thus described my invention, I claim:

1. A sight gauge for insertion into dark fluid receptacles composed of solid transparent material with a flat upper facet for admitting light to the interior of the gauge and a lower facet visible through the upper facet, inclined from the vertical at an angle so related to the angle of refraction of light rays into the fluid in the receptacle as to create by absorption of light thereby, a dark area coincident with the immersed part contrasting with the non-immersed part of the lower facet which reflects the light reaching it from the upper facet; and a coating of light reflecting material on the other surfaces of the sight gauge whereby the amount of light thus passing through the upper facet and reflected by the lower facet is increased in quantity, and whereby the contrast between the appearance of the immersed and the non-immersed portions of the lower facet is increased.

2. A sight gauge for insertion into dark fluid receptacles, composed of an elongated transparent body having a flat horizontal upper facet for admitting light to the interior thereof and a lower facet visible through the upper facet and inclined to the vertical at an angle so related to the angle of refraction of light rays into the fluid in the receptacle as to create by absorption of light thereby, a dark area coincident with the immersed portion and contrasting with the non-immersed portion of the lower facet which latter reflects the light reaching it from the upper facet; the surface of the body adjoining the inclined facet being treated to intensify the light passing through the upper facet and reflected by the lower facet and for thereby increasing the contrast between the immersed and the non-immersed portions of said lower facet.

3. A sight gauge according to claim 1, of plain cylindrical configuration with its bottom end cut crosswise at an angle to provide the lower facet.

4. A sight gauge according to claim 1, having graduations on its lower facet to indicate different fluid levels.

GEORGE SAUER.